United States Patent
Scholz

[11] 3,990,941
[45] Nov. 9, 1976

[54] NUCLEAR REACTOR PRESSURE VESSEL INSTALLATION

[75] Inventor: Manfred Scholz, Erlangen, Germany

[73] Assignee: Siemens Aktiengesellschaft, Munich, Germany

[22] Filed: July 25, 1974

[21] Appl. No.: 491,667

[30] Foreign Application Priority Data
July 27, 1973 Germany............................ 2338303

[52] U.S. Cl.................................. 176/87; 52/224; 52/248
[51] Int. Cl.² ....................................... G21C 11/08
[58] Field of Search ............... 176/87; 52/224, 248, 52/249

[56] References Cited
UNITED STATES PATENTS

| | | | |
|---|---|---|---|
| 3,322,639 | 5/1967 | Davidson | 176/87 X |
| 3,424,239 | 1/1969 | Coudray | 52/224 X |
| 3,536,584 | 10/1970 | Long et al. | 176/87 |
| 3,701,227 | 10/1972 | Lenschow | 52/224 |
| 3,732,654 | 5/1973 | Tsurumi | 52/729 X |

Primary Examiner—Samuel W. Engle
Assistant Examiner—Peter A. Nelson
Attorney, Agent, or Firm—Kenyon & Kenyon Reilly Carr & Chapin

[57] ABSTRACT

A nuclear reactor pressure vessel is installed in the pit of a biological shield forming a concrete wall surrounding the vessel and which defines an annular space around the vessel. A heat insulating layer of concrete surrounds the vessel within the annular space and partially fills the latter, and between the insulation and the concrete wall, steam I or H beams are vertically positioned with their flanges engaging the heat insulating layer and the concrete wall so as to support the heat insulating layer against radial motion when the pressure vessel thermally expands radially, thereby providing the latter with rupture protection. The steel beams are circumferentially interspaced very closely together and possibly with their flange edges abutting, thus forming a large number of vertically extending coolant flow passages which are open at the tops of the vertical beams around the periphery at the top of the vessel, and which are interconnected by an annular manifold at their bottom ends so that a coolant under pressure can be introduced for upward flow, thus protecting the concrete wall from excessive thermal stressing.

4 Claims, 2 Drawing Figures

NUCLEAR REACTOR PRESSURE VESSEL INSTALLATION

BACKGROUND OF THE INVENTION

A nuclear reactor pressure vessel installation is disclosed by the U.S. Keller Application Ser. No. 367,955, filed June 7, 1973, as comprising a pressurized-water reactor pressure vessel surrounded by the wall of a biological shield which forms a space between it and the vessel. Vertical steel beams, each formed in part by two vertical steel channels, are circumferentially interspaced at relatively large distances around the periphery of the reactor pressure vessel to support the latter, but while forming vertical passages of extensive cross-sectional area to which the pressurized-water coolant can escape upwardly with little resistance, in the event the pressure vessel ruptures.

With this relatively large circumferential interspacing of the vertical beams, the wall of the pressure vessel remains substantially unsupported throughout each area between the interspaced beams. However, upwardly extending spaces are formed having the advantage that they may be used for the upward flow of air coolant between the pressure vessel wall and the concrete wall to protect the latter against excessive heating.

SUMMARY OF THE INVENTION

The object of the present invention is to provide an installation having for practical purposes the same possibility for upward flow of a coolant, such as air, between the vessel and the concrete wall, while at the same time providing for the radial support of the pressure vessel wall in a manner that is substantially circumferentially continuous so that the risk of such a pressure wall rupture is very greatly reduced.

According to the invention, the heat insulation layer, which is, of course, made of pressure-resistant concrete, such as cast concrete blocks, surrounds the pressure vessel wall in the circumferentially continuous manner as before. Also, vertical steel beams are positioned between the heat insulation layer and the concrete wall formed by the biological shield.

However, the difference is that the steel beams, which have webs and flanges characteristic of rolled steel structural shapes, are positioned circumferentially very close together with the flange edge of each beam engaging the flange edge of each adjacent beam so that a continuous steel wall circumferentially surrounds the heat insulation in contact therewith, and a corresponding steel wall engages the concrete wall with the webs of the beams functioning as vertically continuous struts.

Preferably the beams are formed by conventional structural steel H or I beam shapes, although channel shapes may conceivably be used. With the first-mentioned shapes, the flanges which engage the heat insulation can be butted against each other to provide the heat insulation layer, and, therefore, the pressure vessel wall, with a circumferentially and vertically continuous steel wall. The usual pressure vessel is generally cylindrical with its heat insulating layer being correspondingly shaped, the contour of the concrete wall of the biological shield being correspondingly contoured. This means that the beam webs are inherently radially arranged so that their flanges which engage the concrete wall are slightly interspaced circumferentially.

Due to the diameter of any reactor pressure vessel of what would be currently considered to be provided by a reactor of high power, the flange interspacing around the concrete wall is very slight.

The vertical coolant channels formed between the beam webs can almost be considered to be circumferentially continuous, being interrupted only by the flanges which are relatively thin. When air or other coolant is passed upwardly between the beam flanges, a steel skin can be interposed between the flanges and the heat insulation layer, to prevent the leakage of the cooling air through the heat insulation layer to the pressure vessel wall, keeping in mind that the heat insulation layer is ordinarily formed by large concrete blocks which possibly provide leakage paths via their abutting edges.

BRIEF DESCRIPTION OF THE DRAWINGS

The accompanying drawings somewhat schematically illustrate the preferred mode for carrying out this invention, the various figures being as follows.

DETAILED DESCRIPTION OF THE INVENTION

Figure 1:
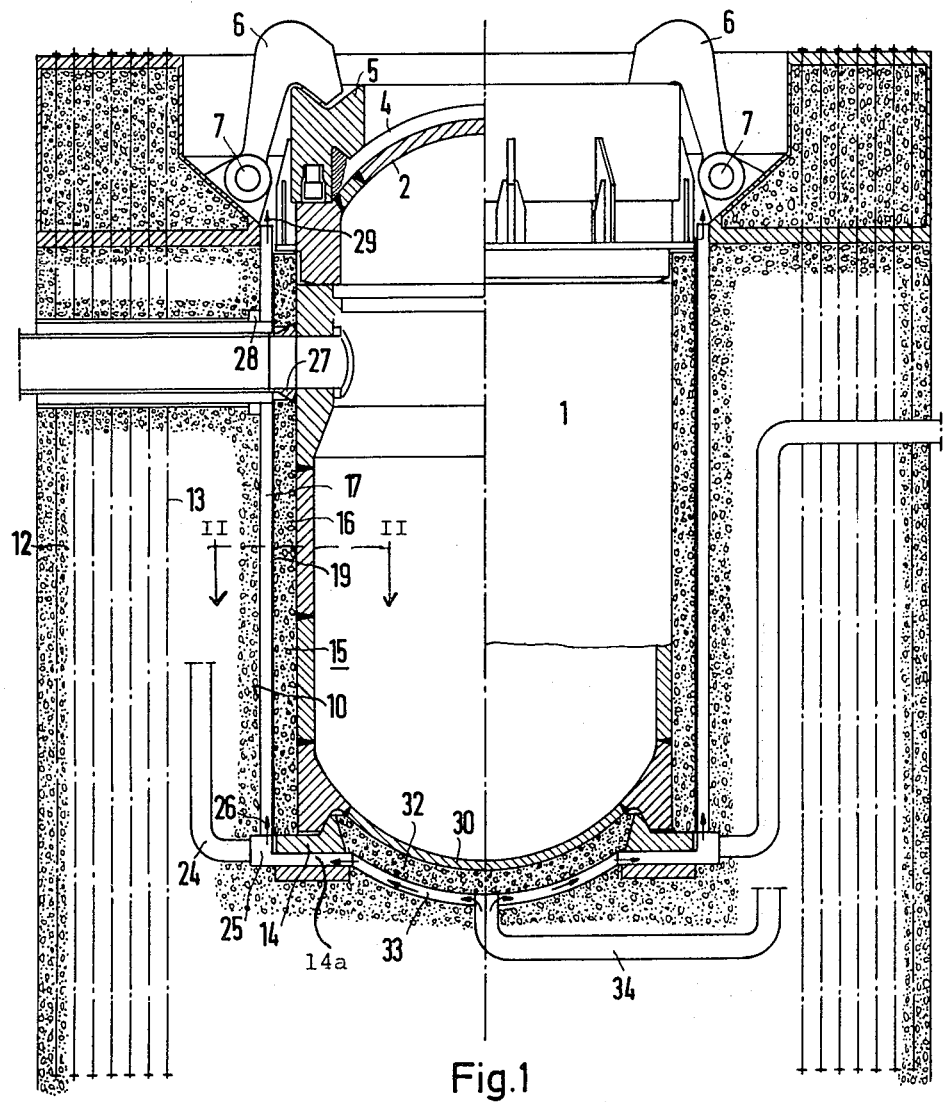
FIG. 1 is a vertical section through a pressurized-water reactor pressure vessel installation, this view being a vertical section showing the vessel itself in section on the left-hand side and partially in elevation on the right-hand side.
Figure 2:
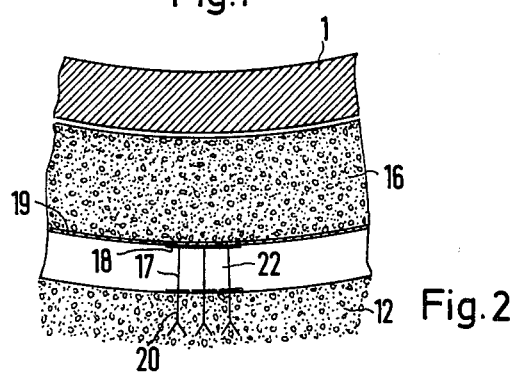
FIG. 2 is a cross section taken on the line II—II in FIG. 1.

Having reference to the above drawing, the pressurized-water reactor installation involved may have a power rating in the area of 1,200 MWe. Therefore, the pressure vessel 1 should be provided with very effective rupture protection.

Consequently, the pressure vessel 1 is made from thick-walled steel annular sections welded edge-to-edge to form a vertical cylindrical vessel having its top closed by a removable head 2 overlayed by reinforcing cover 4 held down via its periphery by an intercept ring 5 firmly secured when the pressure vessel thermally expands vertically, by self-locking hooks 6 pivoted at 7, the biological shield forming the reactor cavity or pit 10 by its concrete wall 12 and by its steel reinforced concrete wall 12 to the top of which the hook pivots 7 are anchored, vertical steel bars 13 extending through the concrete for vertical reinforcement.

The annular space between the concrete wall and the wall of the vessel 1 is shown at 15 while the heat insulating and pressure-resistant concrete wall formed by the large cast blocks is shown at 16, this layer directly contacting the outside of the pressure vessel wall when the latter is thermally expanded radially by operation of the reactor. This concrete layer 16 may occupy about two-thirds of the width or thickness of the annular space 15.

The steel beams previously described are shown at 17 as forming via their abutting flange edges what is substantially a cylinder made of steel. In this instance, I-beam shapes are used with their flanges 18 against which the heat insulating layer 16 presses during reactor operation, forming a circumferentially continuous steel wall transmitting compression to the other flanges of the beams which press against the concrete wall of the biological shield to form there also what is, as a practical matter, another continuous steel wall. When the reactor is in operation, the heat-insulating layer and beams are under compression in the radial direction of the vessel 1 with the concrete wall of the biological shield providing the reaction, the pressure vessel thus being provided with zero-travel restraint. The parts are proportioned so that when the reactor is cold and thermally contracted, the blocks forming the heat-insulating layer can be pulled upwardly to form a space for external pressure wall inspection.

A sheet steel skin 19 is shown as being fastened to the innermost flanges of the beams so that the air coolant ducts 22 formed between the beam webs are provided with the sealing previously referred to. The coolant may be introduced via a duct 24 to an annular manifold space 25 extending peripherally around and open to the bottom ends of the vertical air coolant ducts 22, the air rising upwardly in the direction of the arrow 26 adjacent to the coolant nozzles 27 which radiate from the upper end of the vessel 1, baffles 28 diverting a portion of the upwardly flowing coolant, as by annular ducts 28, so that some of the air coolant flows circumferentially around the nozzles and outwardly in their axial directions, the balance of the air coolant leaving via the tops of the ducts 22 providing the advantage of cooling the steel hooks 6.

To provide for a coolant flow, the steel support ring 14, on which the bottom of the pressure vessel is supported against downward motion, is provided with radial ducts 14a. A hemispherical layer 32 of heat-insulating concrete is positioned against the hemispherical bottom 30 of the pressure vessel 1, and is supported via steel beams 33 by the bottom of the biological shield cavity, these beams extending radially and necessarily being curved, but to some extent in the manner described before, providing coolant ducts which may be supplied with air via a duct 34 extending to the center of the hemispherical nest of steel beams.

What is claimed is:
1. A nuclear reactor pressure vessel installation comprising a vertical reactor pressure vessel made of metal, a concrete wall surrounding said vessel and forming an annular spaced therearound, steel beams vertically positioned in said space so as to form therebetween vertically extending coolant flow passages, and means for flowing coolant through said passages; said beams having webs and inner and outer flanges and being positioned close together with their said inner flanges substantially edge-to-edge to form a substantially circumferentially continuous inner steel wall facing said vessel.

2. The installation of claim 1 in which a pressure-resistant layer is interposed between and in pressure-transmitting relation with said inner steel wall and said vessel, and said outer flanges are in pressure-transmitting relation with said concrete wall.

3. The installation of claim 2 in which a metal skin is interposed between said steel wall and said layer.

4. The installation of claim 3 in which to form said means, an annular manifold connects with the bottoms of said passages and means are provided for supplying a coolant to said manifold.

* * * * *